UNITED STATES PATENT OFFICE.

ISAAC STANWOOD, OF GLOUCESTER, MASSACHUSETTS.

IMPROVEMENT IN PROCESSES FOR OBTAINING ISINGLASS.

Specification forming part of Letters Patent No. 177,764, dated May 23, 1876; application filed March 2, 1876.

*To all whom it may concern:*

Be it known that I, ISAAC STANWOOD, of Gloucester, in the county of Essex and State of Massachusetts, have invented a new and Improved Process for Obtaining Isinglass; and I hereby declare the following to be a full, clear, and exact description thereof.

The object of my invention is to obtain from the skins of salt fish a marketable article of isinglass; and my invention consists in certain steps of a nature to constitute a process, as hereinafter more fully set forth and claimed.

After the skins are stripped I soak them in fresh water long enough to remove all the salt. I then dry them without removing the scales. After they are dried I boil them thoroughly, and carefully strain the liquid off in tanks where all the impurities will settle to the bottom, and the whole will, after proper evaporation, become a solid mass. It is then taken from the tanks, the impurities are cut from the pure mass, which is then cut into thin slices and dried or melted, and spread on a smooth surface to dry. When it is set it is transferred to twine or wire netting, where it is thoroughly and completely dried, and is ready to be packed for market.

Having thus described my invention, what I claim as new, and desire to secure by Letters Patent, is—

The process herein described of producing isinglass from salt fish-skins consisting essentially in soaking them, drying them with the scales on, decanting the liquor after boiling, settling it in tanks, removing the impurities, and then drying in sheets suitable for the market, as set forth.

ISAAC STANWOOD.

Witnesses:
EDWARD STANWOOD,
CHAS. JACKSON.